Figure 1:
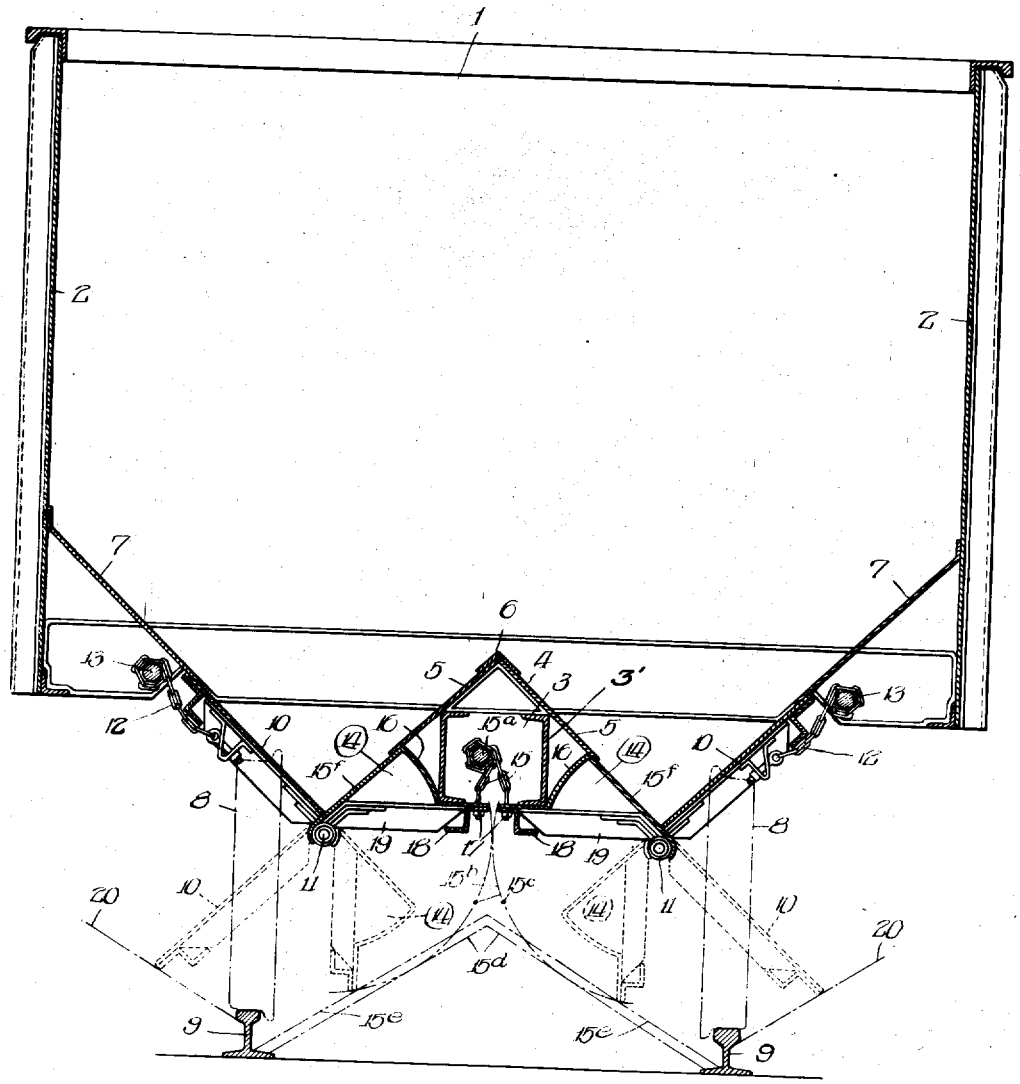

July 6, 1926.

H. S. HART

Re. 16,374

SELECTIVE DUMP CAR

Original Filed Nov. 22, 1923 2 Sheets-Sheet 1

Witness
R. Burkhardt

Inventor
Harry S. Hart,
By Wilkinson, Hartley, Byron & Knight
Attys

July 6, 1926.

H. S. HART

Re. 16,374

SELECTIVE DUMP CAR

Original Filed Nov. 22, 1923 2 Sheets-Sheet 2

Witness:
R. Burkhardt

Inventor:
Harry S. Hart,
By Wilkinson, Huxley, Byron & Knight
Attys.

Reissued July 6, 1926.

Re. 16,374

UNITED STATES PATENT OFFICE.

HARRY S. HART, OF CHICAGO, ILLINOIS, ASSIGNOR TO RODGER BALLAST CAR COMPANY, OF CHICAGO, ILLINOIS, A CORPORATION OF MAINE.

SELECTIVE DUMP CAR.

Original No. 1,522,624, dated January 13, 1925, Serial No. 676,245, filed November 22, 1923. Application for reissue filed April 17, 1926. Serial No. 102,798.

The present invention relates to dump cars, more particularly of the type known as ballast cars, and has for its object to provide a simple, economical, and efficient car by means of which ballast may be deposited either between the rails or outside of the rails, or both between the rails and outside the rails without flooding the track.

Further objects will appear as the description proceeds.

Referring to the drawings—

Figure 2:
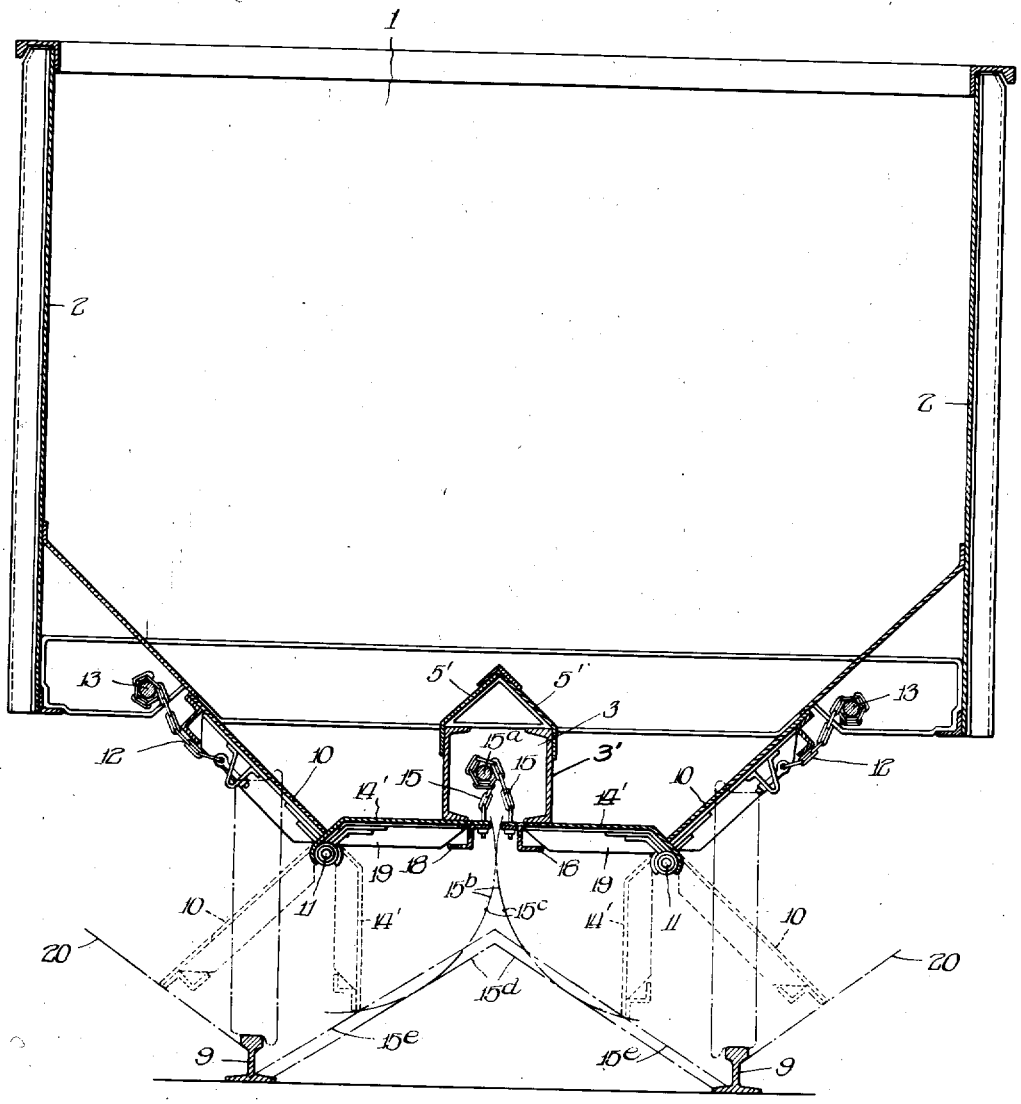

Figure 1 is a transverse sectional view of a railway dump car embodying the principles of the present invention; and Figure 2 is a similar view showing a modification.

In carrying out my invention, I provide a car having the usual underframe comprising a center sill and cross sills, and having between the trucks on each side of the center sill, a longitudinally extending hopper with oppositely swinging inner and outer doors hinged at the apex of the hopper, said doors forming portions of the hopper bottom, so that when the outer doors are swung downwardly, material may be unloaded to the outer side of the rail; when the inner doors are swung downwardly, material may be unloaded between the rails; and when all doors are swung downwardly, material may be deposited both outside and inside the rails.

Referring first to Figure 1 of the drawings, the numeral 1 indicates a railway dump car having the side walls 2, 2. The center sill 3, comprising the channels 3′, 3′, extends longitudinally of the car and is provided with the cope 4 which includes the sloping walls 5, 5, and the angle 6 mounted at the apex formed by the walls 5, 5. The walls 5, 5 slope in a downward and outward direction whereby to shed lading from above the center sill 3. Disposed along the side walls 2, 2 of the car are the sloping walls 7, 7 which slope downwardly and inwardly. Each of the walls 5, 5 cooperates with a corresponding wall 7 to form rigid hopper walls, which hopper walls are provided with doors which will be more specifically referred to hereinafter.

The car 1 is supported by trucks which are indicated diagrammatically by the wheels 8, 8, which ride upon the rails 9, 9. For the purpose of depositing lading outside of the rails 9, 9, doors 10, 10 are provided which are mounted for swinging movement about the fixed axes 11, 11. Said doors 10, 10, when in closed position, lie in substantially the same planes as the corresponding sloping walls 7, 7. Said doors 10, 10, are operated by means of chains 12, 12 which in turn are controlled by the shafts 13, 13 disposed longitudinally of the car.

Depositing of lading between the tracks is controlled by oppositely swinging doors 14, 14 which are swingingly mounted about the axes 11, 11. Said doors 14, 14 are controlled by the chains 15, 15 which in turn are controlled by the rotatable shaft $15^a$ disposed longitudinally of the car.

As will be noted from an inspection of the drawing, the swinging edges of the doors 14, 14 lie adjacent to one another in a plane at a higher level than the plane containing the axes 11, 11. The arcs described by the swinging edges of the doors 14, 14 are indicated by the numerals $15^b$, $15^b$ which, it will be noted, are tangent to one another at a line lying materially below the normally closed positions of the doors 14, 14. The swinging edges of the doors 14, 14 therefore move through a very considerable angle before lading, such as rock ballast, will begin to flow therefrom in any substantial amount. The points indicated by the numerals $15^c$, $15^c$ may be taken to represent approximately the positions of the swinging edges of doors 14, 14 when a substantial flow of ballast will occur from said doors. As the doors 14, 14 open to a greater degree, the lading will pile up in a greater heap and the size of said heap will be determined approximately by the lines $15^d$, $15^d$ which indicate the angle of repose of rock ballast, the limits of said heap being at or near the base of the rails 9, 9 on the inside of said rails. It will be understood, of course, that the angle of repose will vary slightly with different kinds of lading and with varying degrees of wetness of said lading, but, speaking generally, the maximum dimensions of a heap of lading between the tracks will be determined by the lines indicating the angle of repose of said lading, which lines are tangential to the arcs $15^b$, $15^b$ and coincide with the inside portions of the rails 9, 9, below the tops of said rails. In the figures of the drawing the lines representing the angle of repose of certain rock ballast tangent to the arcs $15^b$, $15^b$ are indicated by numerals $15^d$, $15^d$, while $15^e$, $15^e$ indicate lines parallel with the lines $15^d$, $15^d$, said lines $15^e$, $15^e$ corresponding to the full open positions of the doors 14, 14. It will be noted that when the doors 14, 14 are in full open position, that is, the position to which they naturally swing under the effect of gravity, the line representing the angle of repose of the ballast is slightly higher than the line tangential to the arcs $15^b$, $15^b$, but such difference is so small as to be negligible in practical service.

It will be understood, of course, that there is a slight permissible variation in the base of the triangle representing a heap of lading between the tracks. The base of said triangle may be at any level below the tops of the rails so that said base is bounded by the inner surface of the rails below the tops thereof.

In order to make the car shown in Figure 1 absolutely self cleaning, I have provided each of the doors 14, 14 with a portion $15^f$, which, when the corresponding door 14 is in closed position, forms a closure for the corresponding sloping wall 5, said portions $15^f$, $15^f$, abutting against the underside of said sloping walls 5, 5. Said doors 14, 14 also comprise the arcuate shaped portions 16, 16, said arcuate portions having their axes of curvature substantially coincident with the axes 11, 11. Said arcuate portions 16, 16 are designed to just clear the lower edges of the longitudinally extending center sill 3, whereby said arcuate portions form closures with said center sill 3 throughout a considerable range of movement of the doors 14, 14, which, in practice will be substantially equal to the range of movement of the swinging edges of doors 14, 14 to the points represented by the points $15^c$, $15^c$. Disposed adjacent to the arcuate portion 16 of each of the doors 14, is the portions 17, said portions 17, 17 providing the swinging edge portions of the doors. The swinging edge portions 17, 17 are strengthened by means of the Z-bars 18, 18 the doors 14, 14 being strengthened transversely by the angles 19, 19.

Referring now to the advantages and functions of the structure disclosed in Figure 1, it will be noted that when it is desired to deposit lading outside of the rails 9, 9, such deposit may be conveniently made by controlling the swinging doors 10, 10 through operation of the longitudinally extending shafts 13, 13. The closed positions of each of the doors 10, 10 are indicated in full lines and the full open positions of said doors are indicated in broken lines. The speed of the car in its travel along the rails 9, 9, the degree of opening of the doors 10, 10, and the amount of ballast within the car 1, are factors which determine the dimensions of the pile of lading deposited outside of the rails 9, 9. The broken lines 20, 20 indicate angles of repose of lading, such as ballast, such lines being tangential to the arcs described by the swinging edges of the doors 10, 10, and by means of the structure illustrated, the depositing of lading may be conveniently controlled so that the angle of repose will be such that the rails will not be flooded as the car moves along said rails.

When it is desired to deposit lading between the rails 9, 9 this operation can be accomplished by manipulation of the doors 14, 14. The arcuate portions 16, 16 of the doors 14, 14, by reason of their proximity to the lower edge of the center sill 3, prevent the passage of lading until said doors have been opened to a considerable extent, that is, until said doors have been opened to such an extent that said portions 16, 16 will clear the lower edges of the center sill 3, which, in practice, will occur approximately when the swinging edges of doors 14, 14 reach the positions indicated by the numerals $15^c$, $15^c$. When the doors 14, 14 have reached this position, the swinging edges of said doors will have moved to such a sloping position that lading will be directed to a region approximately midway of the rails 9, 9. By reason of the described construction a maximum amount of lading may be deposited between the rails without flooding same. The angle of repose of the lading, such as rock ballast, deposited between the rails is indicated by the lines $15^d$, $15^d$. It will be clear that by reason of the fact that the doors 14, 14 direct lading to a medial region spaced equally from the rails 9, 9 and controlled by one swinging edge of the doors as above described, the danger of flooding said rails is minimized. In service, when the car is being moved along the track, at which time flooding of the rails is most dangerous, the illustrated construction insures a maximum of safety in this regard.

Referring now to Figure 2, it will be noted that the sloping walls 5′, 5′ forming the cope of the center sill 3 do not extend laterally to any substantial extent beyond said center sill 3. Furthermore, the doors mounted for a swinging movement about the axes 11, 11 take a simpler form than that shown in Figure 1. According to the construction shown in Figure 2, the doors 14′, 14′ cooperate with the underside of the center sill 3 to form closures whereby to control the discharge of lading between the rails 9, 9. Said doors 14′, 14′ are controlled by the chains 15, 15, which in turn are controlled by the longitudinally extending shaft $15^a$. Angles 18, 18 are provided for strengthening the swinging edges of doors 14′, 14′, and said doors 14′, 14′ are strengthened laterally by means of the angles 19, 19. The construction of Figure 2 will be readily understood from the description above of Figure 1.

In the operation of the construction shown in Figure 2, when it is desired to deposit lading between the rails, the shaft 15′ will be operated to permit the opening of the doors 14′, 14′. As in the construction illustrated in Figure 1, the swinging edges will determine the dimensions of the lading deposited whereby a maximum of lading may be deposited without flooding the rails.

In this form shown in Figure 2, however, when the material is deposited outside the rails, only a small amount will be left upon the doors 14′ which may be easily shoveled off, while in the form shown in Figure 1, the car is fully self-clearing.

It will be noted by reason of applicant's improved construction the danger of flooding the rails in service is minimized.

Though certain preferred embodiments of the present invention have been described in detail, it will be clear that many modifications will occur to those skilled in the art. It is intended in this patent to cover all such modifications falling within the scope of the appended claims.

I claim:

1. A railway dump car having a V-shaped hopper on each side of the center sill, swinging doors mounted for swinging movement about longitudinally extending axes at the apexes of the hoppers, said doors being of such a length that the arcs described by their swinging edges will be substantially tangential to lines limited by portions of the rails upon which said car is mounted below the tops of said rails, which lines are disposed at the angle of repose of the lading for which said car is designed.

2. A car of the class described having a bottom comprising a V-shaped longitudinal hopper on each side of the center sill, downwardly swinging doors mounted in said hoppers and extending from their hinge points toward the center sill, such doors being of a length sufficient to cause their swinging edges to move in an arc which is substantially tangent to the plane of deposited material at the angle of repose, the base of which angle is below the tops of the rails.

3. A car of the class described having a bottom comprising longitudinally extending substantially V-shaped hoppers, said hoppers being mounted between the center sill and the car sides, downwardly swinging doors hinged at the apexes of the hoppers and extending from the hinging point toward the center sill, said doors being of a length sufficient to cause their swinging edges to move in an arc substantially tangent to the plane of deposited material at the angle of repose, the base of which angle is below the tops of the rails.

4. A car of the class described having a bottom comprising a substantially V-shaped longitudinal hopper on each side of the center sill, a pair of downwardly swinging doors mounted in each of said hoppers at the apex thereof to discharge the lading either to the side of the car or between the rails; said doors being of a length sufficient to cause their swinging edges to move in an arc which is substantially tangent to the plane of deposited material at the angle of repose, the base of which angle is below the tops of the rails.

5. A car of the class described having a center sill, a substantially V-shaped hopper on each side of the center sill, and doors mounted for swinging movement about longitudinally extending axes at the apexes of the hoppers, said doors extending from their hinging axes toward the center sill and being of a length sufficient to cause their swinging edges to remain adjacent each other and prevent material flowing between them in any substantial quantity until said edges are substantially in the planes which define the angle of repose of the deposited material resting upon a base below the tops of the rails.

6. A car of the class described, having a center sill, a substantially V-shaped hopper on each side of the center sill, and doors mounted for swinging movement about longitudinally extending axes substantially at the apexes of the hoppers and having their swinging edges, when in closed position, in a plane at a higher level than the plane of said axes, said doors extending from their said axes toward the center sill and being of a length sufficient to cause their swinging edges to remain adjacent each other and prevent material flowing between them in any substantial quantity until said edges are substantially in the planes which define the angle of repose of the deposited material resting upon a base below the tops of the rails.

The foregoing specification signed at Chicago, county of Cook, and State of Illinois, this 15th day of April, 1926.

HARRY S. HART.